(12) United States Patent
Chamberlin et al.

(10) Patent No.: US 8,659,190 B2
(45) Date of Patent: Feb. 25, 2014

(54) ELECTRIC MACHINE COOLING SYSTEM AND METHOD

(75) Inventors: Bradley D. Chamberlin, Pendleton, IN (US); Clemens Burger, Noblesville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 378 days.

(21) Appl. No.: 13/156,129

(22) Filed: Jun. 8, 2011

(65) Prior Publication Data

US 2011/0298319 A1 Dec. 8, 2011

Related U.S. Application Data

(60) Provisional application No. 61/352,757, filed on Jun. 8, 2010.

(51) Int. Cl.
*H02K 9/00* (2006.01)

(52) U.S. Cl.
USPC .............................................. 310/52; 310/61

(58) Field of Classification Search
USPC .............................................. 310/52–59, 61
See application file for complete search history.

(56) References Cited

U.S. PATENT DOCUMENTS

| | | | |
|---|---|---|---|
| 2,080,678 A | | 5/1937 | Van Horn et al. |
| 2,264,616 A | | 12/1941 | Buckbee |
| 3,217,193 A | * | 11/1965 | Rayner ........................... 310/54 |
| 3,447,002 A | | 5/1969 | Ronnevig |
| 3,525,001 A | | 8/1970 | Erickson |
| 3,748,507 A | | 7/1973 | Sieber |
| 4,038,570 A | | 7/1977 | Durley, III |
| 4,289,985 A | * | 9/1981 | Popov et al. ..................... 310/61 |
| 5,081,382 A | | 1/1992 | Collings et al. |
| 5,180,004 A | | 1/1993 | Nguyen |
| 5,207,121 A | | 5/1993 | Blen |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Thanh Lam
(74) *Attorney, Agent, or Firm* — Greenberg Traurig, LLP (57) ABSTRACT

Embodiments of the invention provide an electric machine module including a housing defining a machine cavity. In some embodiments, an electric machine can be positioned within the machine cavity and include a rotor hub coupled to rotor laminations. The rotor hub can include first and second axial ends and the rotor laminations can include a recess. In some embodiments, the recesses can be aligned to define a portion of a plurality of coolant channels that can be in fluid communication with the machine cavity. In some embodiments, the rotor hub can include first and second rotor hub inlets in fluid communication with at least a portion of the coolant channels. The first and the second rotor hub inlets can be adjacent to the axial ends of the rotor hub. In some embodiments, the coolant channels are in fluid communication with the rotor hub inlets are not the same coolant channels.

20 Claims, 4 Drawing Sheets

(56) References Cited

U.S. PATENT DOCUMENTS

| | | | | |
|---|---|---|---|---|
| 5,293,089 | A | 3/1994 | Frister | |
| 5,372,213 | A | 12/1994 | Hasebe et al. | |
| 5,519,269 | A | 5/1996 | Lindberg | |
| 5,616,973 | A | 4/1997 | Khazanov | |
| 5,859,482 | A | 1/1999 | Crowell et al. | |
| 5,923,108 | A | 7/1999 | Matake et al. | |
| 5,937,817 | A | 8/1999 | Schanz et al. | |
| 5,965,965 | A | 10/1999 | Umeda et al. | |
| 6,011,332 | A | 1/2000 | Umeda et al. | |
| 6,069,424 | A | 5/2000 | Colello et al. | |
| 6,075,304 | A | 6/2000 | Nakatsuka | |
| 6,087,746 | A | 7/2000 | Couvert | |
| 6,095,754 | A | 8/2000 | Ono | |
| 6,097,130 | A | 8/2000 | Umeda et al. | |
| 6,114,784 | A | 9/2000 | Nakano | |
| 6,147,430 | A | 11/2000 | Kusase et al. | |
| 6,147,432 | A | 11/2000 | Kusase et al. | |
| 6,173,758 | B1 | 1/2001 | Ward et al. | |
| 6,181,043 | B1 | 1/2001 | Kusase et al. | |
| 6,201,321 | B1 | 3/2001 | Mosciatti | |
| 6,208,060 | B1 | 3/2001 | Kusase et al. | |
| 6,232,687 | B1 | 5/2001 | Hollenbeck et al. | |
| 6,242,836 | B1 | 6/2001 | Ishida et al. | |
| 6,291,918 | B1 | 9/2001 | Umeda et al. | |
| 6,300,693 | B1 | 10/2001 | Poag et al. | |
| 6,313,559 | B1 | 11/2001 | Kusase et al. | |
| 6,333,537 | B1 | 12/2001 | Arita | |
| 6,335,583 | B1 | 1/2002 | Kusase et al. | |
| 6,346,758 | B1 | 2/2002 | Nakamura | |
| 6,359,232 | B1 | 3/2002 | Markovitz et al. | |
| 6,404,628 | B1 | 6/2002 | Nagashima et al. | |
| 6,417,592 | B2 | 7/2002 | Nakamura et al. | |
| 6,459,177 | B1 | 10/2002 | Nakamura et al. | |
| 6,509,665 | B1 | 1/2003 | Nishiyama et al. | |
| 6,515,392 | B2 | 2/2003 | Ooiwa | |
| 6,522,043 | B2 | 2/2003 | Masegi | |
| 6,559,572 | B2 | 5/2003 | Nakamura | |
| 6,579,202 | B2 | 6/2003 | El-Antably et al. | |
| 6,770,999 | B2 | 8/2004 | Sakurai | |
| 6,897,594 | B2 | 5/2005 | Ichikawa et al. | |
| 6,903,471 | B2 | 6/2005 | Arimitsu et al. | |
| 6,998,749 | B2 | 2/2006 | Wada et al. | |
| 7,002,267 | B2 | 2/2006 | Raszkowski et al. | |
| 7,026,733 | B2 | 4/2006 | Bitsche et al. | |
| 7,239,055 | B2 | 7/2007 | Burgman et al. | |
| 7,276,006 | B2 | 10/2007 | Reed et al. | |
| 7,284,313 | B2 | 10/2007 | Raszkowski et al. | |
| 7,339,300 | B2 | 3/2008 | Burgman et al. | |
| 7,352,091 | B2 | 4/2008 | Bradfield | |
| 7,402,923 | B2 | 7/2008 | Klemen et al. | |
| 7,417,344 | B2 | 8/2008 | Bradfield | |
| 7,476,994 | B2* | 1/2009 | Birdi et al. | 310/61 |
| 7,508,100 | B2 | 3/2009 | Foster | |
| 7,538,457 | B2 | 5/2009 | Holmes et al. | |
| 7,545,060 | B2 | 6/2009 | Ward | |
| 7,592,045 | B2 | 9/2009 | Smith et al. | |
| 7,615,903 | B2 | 11/2009 | Holmes et al. | |
| 7,615,951 | B2 | 11/2009 | Son et al. | |
| 7,667,359 | B2 | 2/2010 | Lee et al. | |
| 7,939,975 | B2 | 5/2011 | Saga et al. | |
| 8,022,582 | B2* | 9/2011 | Dames et al. | 310/54 |
| 8,067,865 | B2 | 11/2011 | Savant | |
| 8,068,327 | B2 | 11/2011 | Seifert et al. | |
| 2003/0094872 | A1* | 5/2003 | Tornquist et al. | 310/91 |
| 2003/0222519 | A1 | 12/2003 | Bostwick | |
| 2004/0036367 | A1 | 2/2004 | Denton et al. | |
| 2004/0189110 | A1 | 9/2004 | Ide | |
| 2004/0195929 | A1 | 10/2004 | Oshidari | |
| 2005/0023266 | A1 | 2/2005 | Ueno et al. | |
| 2005/0023909 | A1 | 2/2005 | Cromas | |
| 2005/0151429 | A1* | 7/2005 | Taketsuna et al. | 310/54 |
| 2005/0194551 | A1 | 9/2005 | Klaussner et al. | |
| 2005/0274450 | A1 | 12/2005 | Smith et al. | |
| 2005/0285456 | A1 | 12/2005 | Amagi et al. | |
| 2006/0113851 | A1* | 6/2006 | Ishihara et al. | 310/52 |
| 2007/0024130 | A1 | 2/2007 | Schmidt | |
| 2007/0052313 | A1 | 3/2007 | Takahashi | |
| 2007/0063607 | A1 | 3/2007 | Hattori | |
| 2007/0145836 | A1 | 6/2007 | Bostwick | |
| 2007/0149073 | A1 | 6/2007 | Klaussner et al. | |
| 2007/0194638 | A1* | 8/2007 | Birdi et al. | 310/54 |
| 2007/0216236 | A1 | 9/2007 | Ward | |
| 2008/0223557 | A1 | 9/2008 | Fulton et al. | |
| 2009/0121562 | A1 | 5/2009 | Yim | |
| 2009/0121563 | A1* | 5/2009 | Zhou et al. | 310/54 |
| 2009/0174278 | A1 | 7/2009 | Sheaffer et al. | |
| 2009/0206687 | A1 | 8/2009 | Woody et al. | |
| 2010/0026111 | A1 | 2/2010 | Monzel | |
| 2010/0102649 | A1 | 4/2010 | Cherney et al. | |
| 2010/0109454 | A1 | 5/2010 | Vadillo et al. | |
| 2010/0164310 | A1* | 7/2010 | Dames et al. | 310/54 |
| 2010/0176668 | A1 | 7/2010 | Murakami | |
| 2011/0050141 | A1 | 3/2011 | Yeh et al. | |
| 2011/0101700 | A1 | 5/2011 | Stiesdal | |
| 2011/0109095 | A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 09-154257 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report, Received Feb. 16, 2012.
International Search Report, Received Jan. 9, 2012.
International Search Report, Received Dec. 22, 2011.

(56) References Cited

OTHER PUBLICATIONS

International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
International Search Report, mailed Jul. 31, 2012.
WIPO Search Report and Written Opinion dated Nov. 14, 2012 for corresponding Application No. PCT/US2012/040794; 8 sheets.

\* cited by examiner

ELECTRIC MACHINE COOLING SYSTEM AND METHOD

RELATED APPLICATIONS

This application claims priority under 35 U.S.C. §119 to U.S. Provisional Patent Application No. 61/352,757 filed on Jun. 8, 2010, the entire contents of which is incorporated herein by reference.

BACKGROUND

When the topology of an electric machine uses permanent magnets, the magnet temperature should be controlled. Cooler magnets can lead to improved machine performance. In addition, maintaining magnets at cooler temperatures can reduce their risk of demagnetization. Because, in some conventional electric machines, the permanent magnets are positioned in the rotor assembly, cooling the magnets can be difficult. Some conventional methods of cooling electric machines can include circulating a coolant around a portion of an outer perimeter of the electric machine. Because the rotor assembly can be positioned radially inward from the outer perimeter of the machine, transmission of heat energy produced by the rotor assembly to the coolant can be difficult.

SUMMARY

Some embodiments of the invention provide an electric machine module including a housing defining a machine cavity. In some embodiments, an electric machine can be positioned within the machine cavity and can include a rotor hub coupled to rotor laminations. In some embodiments, the rotor hub can include opposing first and second axial ends and the rotor laminations can include at least one recess. In some embodiments, the recesses can be substantially aligned to define at least a portion of a plurality of coolant channels that can be in fluid communication with the machine cavity. In some embodiments, the rotor hub can include at least first and second rotor hub inlets in fluid communication with at least a portion of the coolant channels. In some embodiments, the first and the second rotor hub inlets can be located adjacent to the first and the second axial ends of the rotor hub, respectively. In some embodiments, the coolant channels in fluid communication with the first and the second rotor hub inlets are not the same coolant channels.

Some embodiments of the invention provide an electric machine module including a housing defining a machine cavity. In some embodiments, an electric machine can be positioned within the machine cavity and can include a rotor assembly. In some embodiments, the rotor assembly can be operatively coupled to an output shaft, which can include at least one output shaft coolant channel and at least one output shaft coolant outlet in fluid communication with the output shaft coolant channel. In some embodiments, the rotor assembly can include at least one magnet, a first axial end, and a second axial end. In some embodiments, the first axial end can substantially oppose the second axial end. In some embodiments, the rotor assembly can include a plurality of coolant channels extending from the first axial end to the second axial end, and the plurality of coolant channels can be in fluid communication with the machine cavity. In some embodiments, at least one rotor hub channel can be positioned through a portion of the rotor assembly so that the rotor hub channel is in fluid communication with the output shaft coolant outlet and the plurality of coolant channels. In some embodiments, at least a first rotor hub inlet can be positioned through a portion of the rotor assembly substantially adjacent to the first axial end and at least a second rotor hub inlet can be positioned through a portion of the rotor assembly substantially adjacent to the second axial end. In some embodiments, the first rotor hub inlet can be in fluid communication with at least a portion of the plurality of coolant channels and the second rotor hub inlet can be in fluid communication with at least a portion of the plurality of coolant channels. In some embodiments, the portion of the coolant channels that is in fluid communication with the first rotor hub inlet, the portion of the coolant channels that is in fluid communication with the second rotor hub inlet, and the portion of the coolant channels that is in fluid communication with the rotor hub channel are not the same coolant channels.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1:
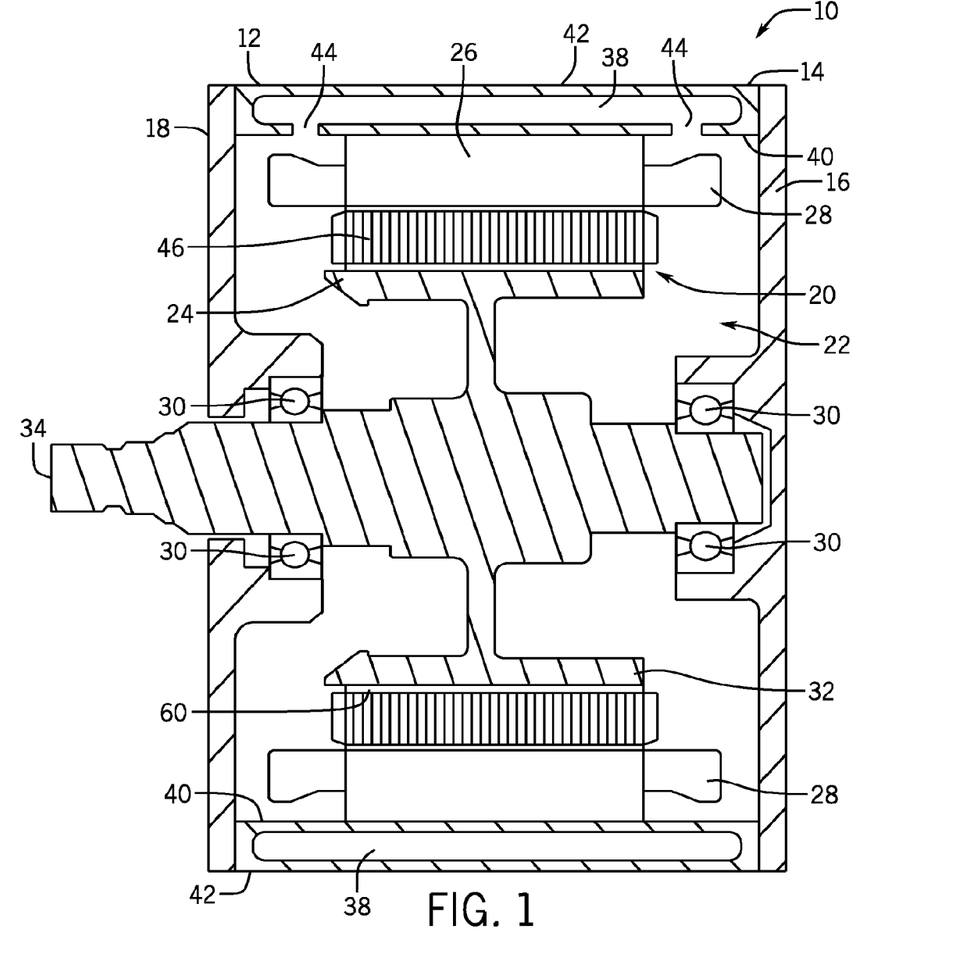
FIG. 1 is a perspective view of a electric machine module according to one embodiment of the invention.

FIG. 1 illustrates an electric machine module 10 according to one embodiment of the invention. The module 10 can include a module housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments the housing 12 can comprise a substantially cylindrical canister and a single end cap (not shown). Further, in some embodiments, the module housing 12, including the sleeve member 14 and the end caps 16, 18, can be fabricated from materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can include a rotor 24, a stator assembly 26, including stator end turns 28, and bearings 30, and can be disposed about an output shaft 34. As shown in FIG. 1, the stator assembly 26 can substantially circumscribe the rotor 24. In some embodiments, the rotor assembly 24 can also include a rotor hub 32 or can have a "hub-less" design (not shown).

In some embodiments, the rotor assembly 24 can be operatively coupled to the output shaft 34 so that the two elements can substantially synchronously move together. In some embodiments, the output shaft 34 can comprise a plurality of splines (not shown) configured and arranged to engage a plurality of splines 36 on the rotor hub 32. In some embodiments, the engagement of the splines can at least partially lead to coupling of the rotor assembly 24 and the output shaft 34. For example, in some embodiments, during operation of the electric machine 20, when the output shaft splines are engaged with the rotor hub splines 36, torque generated by the electric machine 20 can be transferred from the rotor assembly 24 to the output shaft 34. In some embodiments, the output shaft 34 can be operatively coupled to a positive stop (not shown) on the rotor hub 32 to transfer torque. In some embodiments, the output shaft 34 can be operatively coupled to the positive stop on the rotor hub 32 using a bolt (not shown) or any other conventional fastener. Moreover, in some embodiments, the output shaft 34 can comprise a male-configured spline set and in other embodiments, the output shaft 34 can comprise a female-configured spline set.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor 24, the stator assembly 26, and the stator end turns 28 can generate heat during operation of the electric machine 20. These components can be cooled to increase the performance and the lifespan of the electric machine 20.

As shown in FIG. 1, in some embodiments, the sleeve member 14 can comprise a coolant jacket 38. For example, in some embodiments, the sleeve member 14 can include an inner wall 40 and an outer wall 42 and the coolant jacket 38 can be positioned substantially between the walls 40, 42. In some embodiments, the coolant jacket 38 can substantially circumscribe at least a portion of the electric machine 20. More specifically, in some embodiments, the coolant jacket 38 can substantially circumscribe at least a portion of an outer diameter of the stator assembly 26, including the stator end turns 28.

Further, in some embodiments, the coolant jacket 38 can contain a coolant that can comprise transmission fluid, ethylene glycol, an ethylene glycol/water mixture, water, oil, motor oil, a mist, a gas, or another substance capable of receiving heat energy produced by the electric machine module 10. The coolant jacket 38 can be in fluid communication with a coolant source (not shown) which can pressurize the coolant prior to or as it is being dispersed into the coolant jacket 38, so that the pressurized coolant can circulate through the coolant jacket 38.

Also, in some embodiments, the inner wall 40 can include coolant apertures 44 so that the coolant jacket 38 can be in fluid communication with the machine cavity 22. In some embodiments, the coolant apertures 44 can be positioned substantially adjacent to the stator end turns 28. For example, in some embodiments, as the pressurized coolant circulates through the coolant jacket 38, at least a portion of the coolant can exit the coolant jacket 38 through the coolant apertures 44 and enter the machine cavity 22. Also, in some embodiments, the coolant can contact the stator end turns 28, which can lead to at least partial cooling. After exiting the coolant apertures 44, at least a portion of the coolant can flow through portions of the machine cavity 22 and can contact various module 10 elements, which, in some embodiments, can lead to at least partial cooling of the module 10.

Figure 2A:
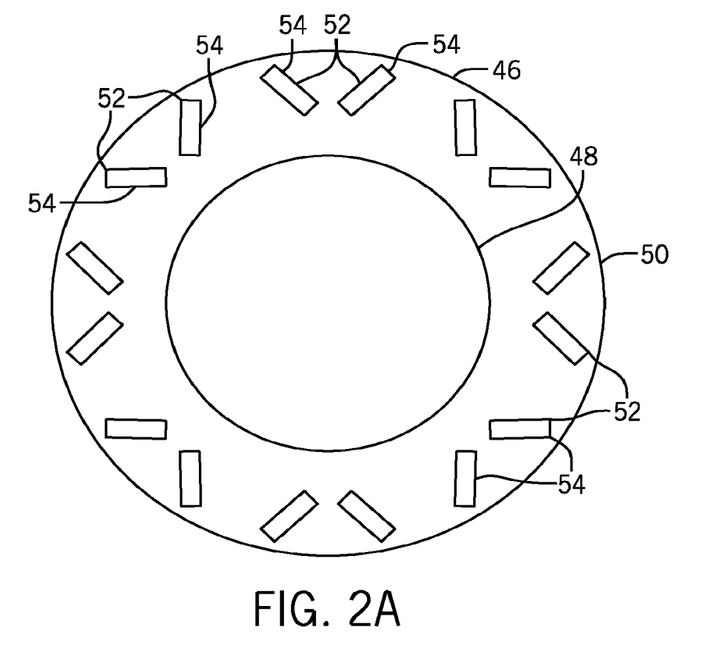
FIGS. 2A and 2B are views of rotor laminations according to one embodiment of the invention.
Figure 2B:
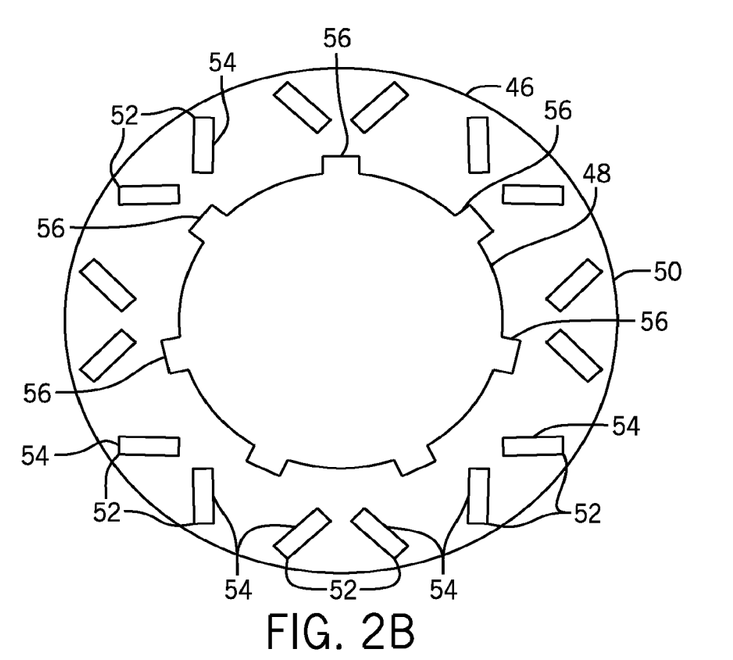
Figure 3:
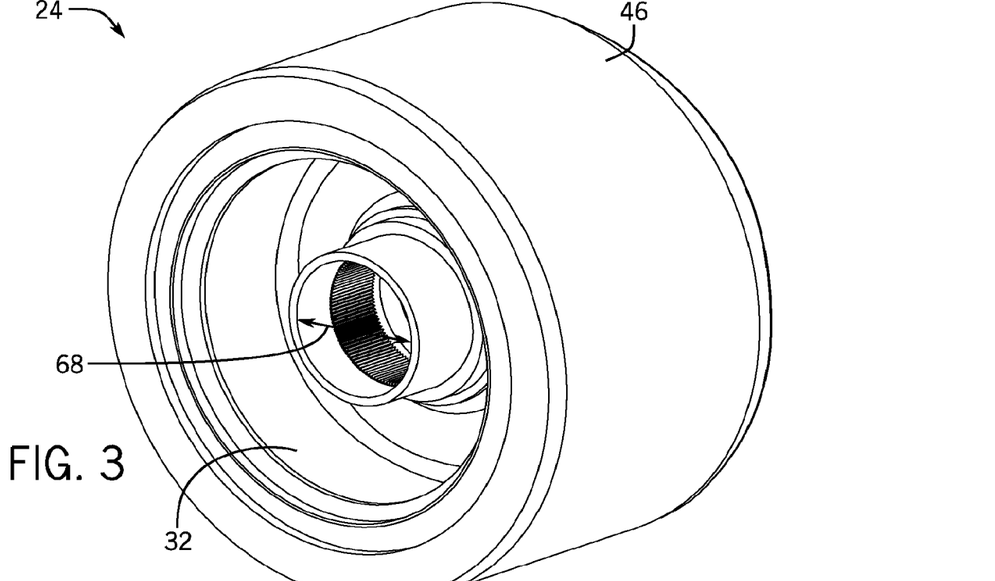
FIG. 3 is a perspective view of a rotor assembly according to one embodiment of the invention.

As shown in FIGS. 1-2B, in some embodiments, the rotor assembly 24 can comprise a plurality of rotor laminations 46. In some embodiments, the rotor laminations 46 can comprise a plurality of generally annular-shaped structures configured and arranged to be coupled to at least a portion of the rotor hub 32. In some embodiments, the rotor laminations 46 can comprise other shapes that are capable of engaging the rotor hub 32 (e.g., so that the shapes of the two elements are substantially similar). In some embodiments, each of the rotor laminations can comprise an inner diameter 48 and an outer diameter 50 and can be coupled together to form at least a portion of the rotor assembly 24.

In some embodiments, as shown in FIGS. 2A and 2B, the rotor laminations 46 can comprise multiple elements. In some embodiments, at least a portion of the laminations 46 can include a plurality of apertures 52 that are configured and arranged to support at least a portion of a plurality of magnets 54. For example, in some embodiments, after assembling the laminations 46, the apertures 52 can substantially align in a generally axial direction so that the magnets 54 can be positioned within the rotor assembly 24 in a substantially axial direction. Moreover, in some embodiments, the magnets 54 can be disposed of within the rotor assembly so that at least a portion of the magnets are not substantially axially aligned. For example, in some embodiments, the magnets 54 can be positioned so that some of the magnets 54 are positioned approximately two degrees apart (e.g., skewed).

Additionally, in some embodiments, at least a portion of the laminations 46 can comprise at least one recess 56, as shown in FIG. 2B. In some embodiments, some of the laminations 46 can comprise a plurality of recesses 56. In some embodiments, the recesses 56 can be formed during rotor lamination 46 fabrication (e.g., stamping, molding, casting, etc.) and in other embodiments, the recesses 56 can be machined into the laminations 46 after fabrication to suit end user and/or manufacturer requirements. Referring to FIG. 2B, in some embodiments, the recesses 56 can be positioned along the inner diameter 48 of the laminations 46. For example, in some embodiments, the recesses can be arranged in a substantially regular pattern along the circumference of the inner diameter 48. In other embodiments, the recesses 56 can be arranged at substantially irregular intervals.

Figure 4:
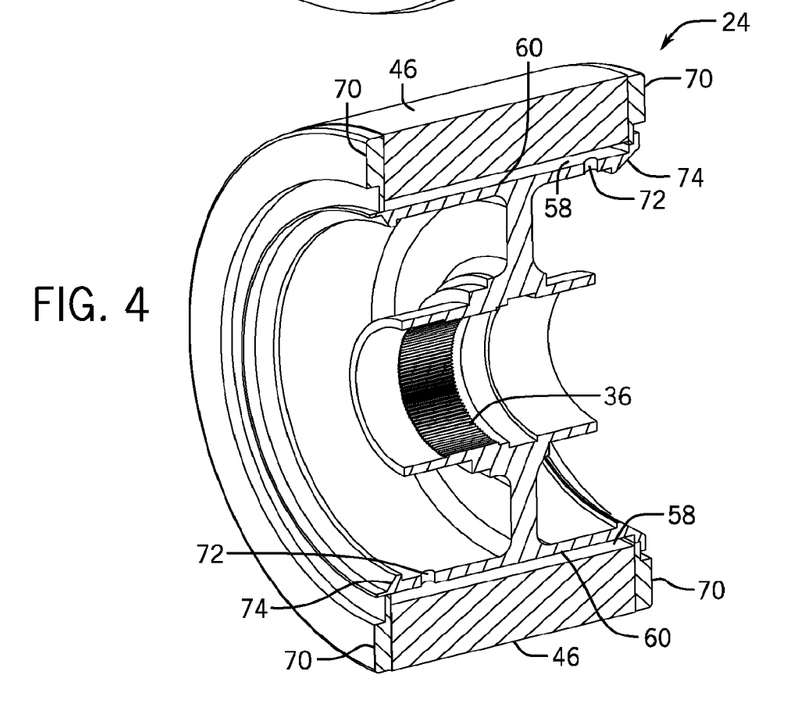
FIG. 4 is a perspective cross-sectional view of the rotor assembly of FIG. 3.
Figure 5:
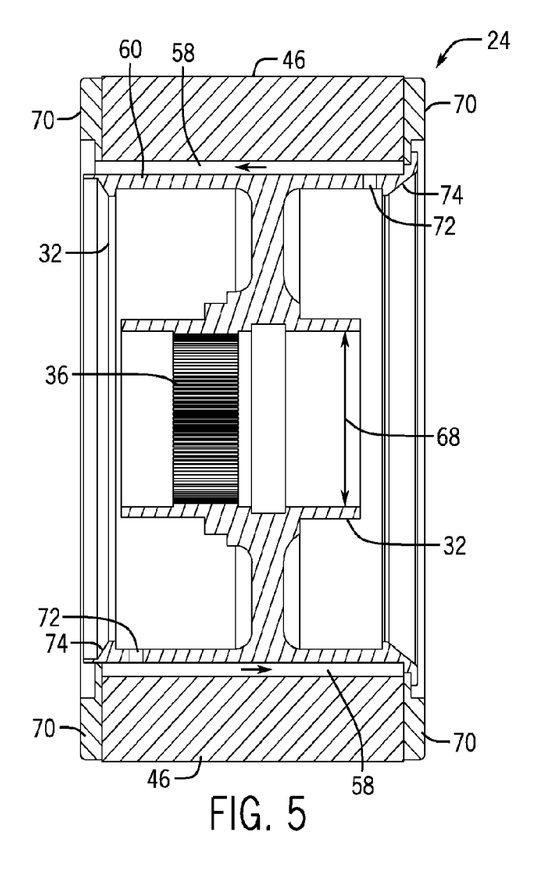
FIG. 5 is a front cross-sectional view of the rotor assembly of FIG. 3.
Figure 6:
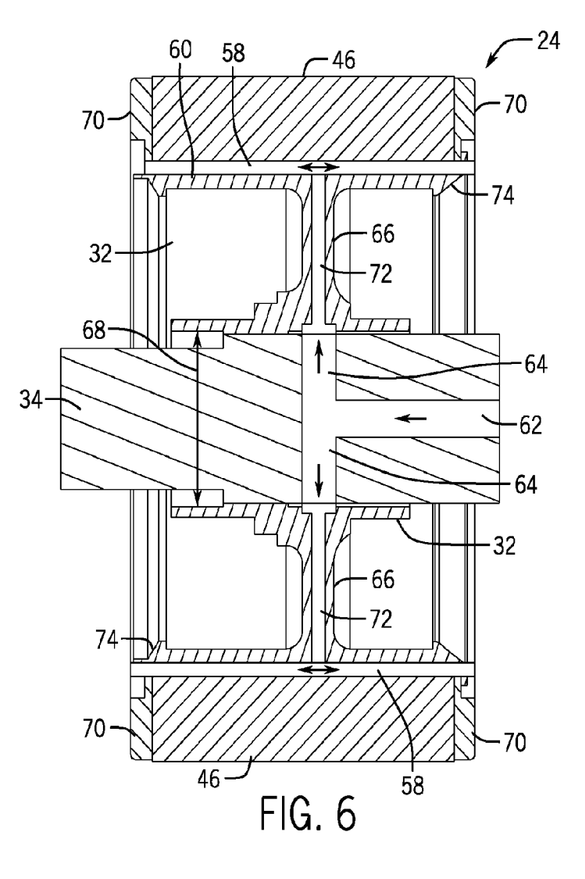
FIG. 6 is a front cross-sectional view of the rotor assembly according to another embodiment of the invention.

Additionally, in some embodiments, at least a portion of the laminations 46 of the rotor assembly 24 can each comprise recesses 56 in substantially similar positions so that after assembly, the recesses 56 can substantially align to form at least a portion of at least one coolant channel 58, as shown in FIGS. 4-6. In some embodiments comprising laminations 46 including a plurality of recesses 56, more than one coolant channel 58 can be formed. For example, in some embodiments, the rotor assembly 24 can be substantially assembled so that the inner diameter 48 of the laminations 46 is immediately adjacent to an outer diameter 60 of the rotor hub 32. As a result, in some embodiments, the coolant channels 58 can be substantially defined by the recesses 56 and the outer diameter 60 of the rotor hub 32. In some embodiments, the rotor hub 32 can comprise the recesses 56 in a manner similar to the rotor laminations 46 (e.g., formed substantially integral with the rotor hub 32, machined into the outer diameter 60 of the rotor hub 32, etc.). Moreover, in some embodiments, after assembly of the rotor assembly 24, the recesses 56 can be configured and arranged so that the coolant channels 58 can be in fluid communication with the machine cavity 22. As described in more detail below, in some embodiments, the coolant channels 58 can be configured and arranged to guide the coolant through the rotor assembly 24 and into the machine cavity 22 to aid in cooling some elements of the rotor assembly 24, including the magnets 54. Additionally, in some embodiments, the coolant channels 58 can be substantially linear and in other embodiments, the rotor hub 32 and/or the laminations 46 can be configured and arranged so that at least a portion of the coolant channels 58 are substantially non-linear (i.e., skewed, helical, curved, etc.)

In some embodiments, in addition to the coolant jacket 38 and the coolant apertures 44, the coolant can be dispersed from a point generally radially central with respect to the electric machine module 10. In some embodiments, a coolant source (not shown) can be located either internal or adjacent to a output shaft 34 so that the coolant can flow either inside of or adjacent to the output shaft 34. For example, in some embodiments, the output shaft 34 can include at least one output shaft coolant channel 62 and at least one output shaft coolant outlet 64 so that the coolant can flow through the channel 62 and at least a portion of the coolant can exit the output shaft channel 62 through the output shaft coolant outlet 64. In some embodiments, the output shaft coolant outlet 62 can comprise a plurality of output shaft coolant outlets 64. Also, in some embodiments, output shaft coolant outlets 64 can be positioned along the axial length of the output shaft 34 so that the coolant can be dispersed to different areas of the module 10, including the bearings 30.

As shown in FIGS. 4 and 6, some embodiments of the invention can include at least one rotor hub channel 66. Although, in some embodiments, the rotor hub 32 can include a plurality of rotor hub channels 66. For example, in some embodiments, the rotor hub channels 66 can be positioned within the rotor hub 32 and can be generally perpendicular to a horizontal axis of the output shaft 34. For example, in some embodiments, the rotor hub channel 66 can comprise a passageway which can extend from the outer diameter 60 of the rotor hub 32 to an inner diameter 68 of the rotor hub 32, although the rotor hub channel 66 need not extend the entire radial length of the rotor hub 32. Furthermore, in some embodiments, the rotor hub channels 66 can be in fluid communication with at least a portion of the output shaft coolant outlets 64. In some embodiments, centrifugal force created by the movement of the operating rotor assembly 24 can cause at least some of the coolant to flow from the output shaft coolant outlets 64 radially outward through at least a portion of the rotor hub channels 66.

In some embodiments, at least a portion of the rotor hub channels 66 can be in fluid communication with at least a portion of the coolant channels 58. For example, as shown by the arrows in FIG. 6, in some embodiments, at least partially due to the centrifugal force, the coolant can flow radially outward through the rotor hub channels 66 and can enter at least a portion of the coolant channels 58. In some embodiments, after entering the coolant channels 58, at least a portion of the coolant can flow in one of or both axial directions of the coolant channels 58, as shown in FIG. 6. For example, in some embodiments, after entering at least a portion of the coolant channels 58, the coolant can flow in the direction of both axial ends of the rotor assembly 24 and can then enter the machine cavity 22. In some embodiments, at least one of the axial ends of a portion of the coolant channels 58 can be substantially sealed so that coolant flows into the machine cavity 22 through only one axial end of the coolant channels 58. In some embodiments, an end ring 70 can be coupled to at least one of or both one of or both axial faces of the rotor assembly 24. In some embodiments, the end ring 70 can at least partially function to guide, urge, and/or direct coolant toward other elements of the module 10, such as the stator end turns 28. In some embodiments, the end ring 70 can comprise a balance ring, an agitator ring, a coolant guide, or other similar structure.

Moreover, in some embodiments, after entering the machine cavity 22, the coolant can circulate through portions of the machine cavity 22 where it can contact different elements of the module 10 to receive at least a portion of the heat energy produced, which can aid in cooling. Additionally, in some embodiments, while flowing through the coolant channels 58, the coolant can receive at least a portion of the heat energy produced by the magnets 54 and other elements of the rotor assembly 24, which can lead to cooling of at least a portion of the rotor assembly 24. For example, in some embodiments, as the temperature around the magnets 54 is at least partially reduced, the electric machine 20 can operate at higher levels of performance. In addition, by extracting the heat from the magnets 54, the propensity of demagnetization of the magnets 54 is at least partially reduced.

In some embodiments, the rotor assembly 24, including the coolant channels 58 can comprise different configurations. In some embodiments, at least a portion of the coolant channels 58 can be fluidly connected to the machine cavity 22 via at least one rotor hub inlet 72. By way of example only, in some embodiments, as shown in FIGS. 4 and 5, the rotor hub inlet 72 can be positioned through a portion of the rotor hub 32 so that the at least a portion of the coolant in the machine cavity 22 that is proximal to the rotor hub 32 can enter at least a portion of the coolant channels 58 via the rotor hub inlets 72.

In some embodiments, the rotor hub inlets 72 can be positioned near the axial edges of the rotor hub 32, as shown in FIGS. 4 and 5. Moreover, in some embodiments, the rotor assembly 24 can be configured and arranged so that portions of the coolant can flow in substantially both axial directions. For example, in some embodiments, the rotor hub 32 can comprise a plurality of rotor hub inlets 72 adjacent to axial sides of the rotor hub 32. In some embodiments, the rotor hub inlets 72 on the axial sides can be offset so that at least a portion of the rotor hub inlets 72 are in fluid communication with only one coolant channel 58 (e.g., one rotor hub inlet 72 per coolant channel 58). Additionally, in some embodiments, at least a portion of the coolant channels 58 can be substantially unidirectional. For example, in some embodiments, at least one axial end of at least a portion of the coolant channels 58 can be substantially sealed so that any coolant entering the coolant channel 58 would only flow out of the channel 58 at the axial end opposite the sealed end. By way of example only, in some embodiments, the end lamination 46 can be differently configured so that the coolant channel 58 does not extend through that lamination 46. In other embodiments, the balance ring 70 on the substantially sealed end can extend a radial distance to substantially seal the coolant channel 58, as shown in FIG. 5.

As a result, in some embodiments, the coolant can circulate in at least two different axial directions. For example, in some embodiments, a first portion of the coolant can enter at least one rotor hub inlet 72 on a first axial side (e.g., either the left side or the right side of the rotor hub 32) adjacent to where the coolant channel 58 is sealed. As a result, in some embodiments, due at least in part to centrifugal force, the coolant can circulate through the coolant channel 58 toward a second side of the rotor hub 32 (i.e., the opposite side of the rotor hub 32) and then enter the machine cavity 22, as shown by the arrows in FIG. 5. Moreover, in some embodiments, another portion of coolant can enter at least one rotor hub inlet 72 on the second axial side, which is in fluid communication with at least one different coolant channel 58 adjacent to where the coolant channel 58 is sealed. As a result, in some embodiments, due at least in part to centrifugal force, the coolant can circulate through the coolant channel 58 toward the first side of the rotor hub 32 and then enter the machine cavity 22, as shown by the arrows in FIG. 5. Accordingly, in some embodiments, at least a portion of the coolant can flow through different coolant channels 58 in substantially opposite directions. In some embodiments, this bi-directional flow can at least partially increase heat energy transfer from the magnets 54 and other portions of the rotor assembly 24. By passing the coolant in both directions, the average magnet temperature on each end of the rotor assembly 24 can be maintained at a generally comparable level.

In some embodiments, the rotor hub 32 and/or the rotor assembly 24 can be configured and arranged to permit and/or enhance coolant flow through the rotor hub inlets 72. For example, in some embodiments, an annular flange 74 can be positioned substantially at or adjacent to the axial edges of the rotor hub 32. In some embodiments, the flange 74 can be machined into the rotor hub 32 and in other embodiments the flange 74 can be coupled to the rotor hub 32, or the rotor hub 32 can be formed so that the flange 74 is substantially integral with the rotor hub 32.

In some embodiments, the flange 74 can be configured and arranged to guide coolant toward the rotor hub inlets 72. For example, in some embodiments, a portion of the coolant in the machine cavity 22 that originates from the coolant apertures 44, the coolant channels 58, and/or any other source, can be forced to flow along an interior surface of the rotor hub 32, due to centrifugal force. As a result, at least a portion of the coolant can flow through the rotor hub inlets 72, as previously mentioned. However, in some embodiments, the flange 74 can retain at least a portion of the remaining coolant that does not readily flow through the rotor hub inlets 72 so that more coolant can be directed through the rotor hub inlets 72 relative to embodiments functioning without the flange 74.

Also, in some embodiments, the rotor hub 32 and/or the rotor assembly 24 can comprise other configurations to at least partially enhance coolant entry into the rotor hub inlets 72. In some embodiments, at least a portion of rotor hub 32 immediately adjacent to the rotor hub inlet 72 can be configured and arranged to guide, urge, and/or direct coolant through the rotor hub inlet 72 and into the coolant channels 58. For example, in some embodiments, a portion of the rotor hub 32 immediately adjacent to the rotor hub inlet 72 can comprise a substantially tapered, angled, and or funnel-shaped configuration so that a combination of centrifugal forces and the configuration can at least partially direct coolant into the coolant channels 58 via the rotor hub inlets 72. Additionally, in some embodiments, a portion of the rotor hub 32 adjacent to the rotor hub inlets 72 can comprise structures, such as, but not limited to grooves, slots, guides, etc. that are configured and arranged to direct coolant toward the rotor hub inlets 72. For example, in some embodiments, a region of the rotor hub 32 can comprise at least one feeder groove (not shown) that can receive coolant and, in combination with the centrifugal force due the movement of the rotor hub 32, direct coolant toward the rotor hub inlets 72.

In some embodiments, different rotor assembly 24 cooling configurations can be employed to at least partially optimize magnet 54 and rotor assembly 24 cooling. By way of example only, in some embodiments, coolant can enter the rotor assembly 24 via multiple avenues. For example, in some embodiments, an electric machine module 10 can include the coolant flow path originating with the output shaft coolant channel 62 and outlet 64 and flowing through the rotor hub channel 66 before entering the coolant channel 58. Additionally, in some embodiments, the same module 10 can also comprise the rotor hub inlets 72 and substantially unidirectional coolant channels 58 previously mentioned. As a result, in some embodiments, a single module 10 can comprise coolant flowing through the rotor assembly 24 in both directions through coolant channels 58 in fluid communication with the rotor hub channel 66 and in two different axial directions through coolant channels 58 in fluid communication with the rotor hub inlets 72 at adjacent to the axial edges of the rotor hub 32.

In addition, in some embodiments, the rotor assembly 24 can comprise multiple coolant channels 58 including the previously mentioned configurations. By way of example only, and in no way limiting the scope of the disclosure, in some embodiments, the rotor assembly 24 can comprise coolant channels 58 in fluid communication with rotor hub channels 66 at various points around the circumference of the rotor hub 32 (e.g., 0 degrees, 90 degrees, 180 degrees, 270 degrees, etc.) and coolant channels 58 in fluid communication with rotor hub inlets 74 at regular or irregular intervals between the other coolant channels 58. As a result, in some embodiments, coolant can flow through multiple coolant channels 58 in axial directions to enhance rotor assembly 24 cooling, including cooling of the magnets 54.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a housing at least partially defining a machine cavity; and
an electric machine positioned substantially within the machine cavity and at least partially enclosed by the housing, the electric machine including a rotor assembly including a rotor hub coupled to a plurality of rotor laminations, the rotor hub including a first axial end and a second axial end, the first axial end substantially opposing the second axial end, at least a portion of the rotor laminations comprising at least one aperture so that when the plurality of rotor laminations are coupled to the rotor hub, the apertures of the rotor laminations are configured and arranged to support at least one magnet, the rotor assembly comprising a plurality of coolant channels fluidly coupled with the machine cavity, at least a first rotor hub inlet disposed in a portion of the rotor hub substantially adjacent to the first axial end, and at least a second rotor hub inlet disposed in a portion of the rotor hub substantially adjacent to the second axial end, the first rotor hub inlet fluidly coupled with at least one of the plurality of coolant channels and the second rotor hub inlet fluidly coupled with at least one of the plurality of coolant channels, and wherein the at least one coolant channel that is fluidly coupled with the first rotor hub inlet and the at least one coolant channel that is fluidly coupled with the second rotor hub inlet are not the same coolant channels.

2. The electric machine module of claim 1 and further comprising at least one end ring coupled to at least one of the first axial end and the second axial end of the rotor assembly.

3. The electric machine module of claim 2, wherein the at least one balance ring is configured and arranged to guide a coolant into the machine cavity from the plurality of coolant channels.

4. The electric machine module of claim 1, wherein the at least one coolant channel that is fluidly coupled with the first rotor hub inlet is substantially sealed immediately adjacent to the first axial end so that the coolant channel is fluidly coupled with the machine cavity only at the second axial end.

5. The electric machine module of claim 4, wherein the at least one coolant channel that is fluidly coupled with the second rotor hub inlet is substantially sealed immediately adjacent to the second axial end so that the coolant channel is fluidly coupled with the machine cavity only at the first axial end.

6. The electric machine module of claim 1 and further comprising a coolant jacket positioned within the housing and a plurality of coolant apertures positioned through a portion of the housing so that the coolant jacket is in fluid communication with the machine cavity.

7. The electric machine module of claim 1, wherein the rotor assembly comprises a first flange positioned substantially adjacent to the first axial end and a second flange positioned substantially adjacent to the second axial end, wherein the first flange and second flange are configured and arranged to guide at least a portion of a coolant toward the first and the second rotor hub inlets, respectively.

8. The electric machine module of claim 1, wherein the electric machine further comprises a stator assembly substantially circumscribing at least a portion of the rotor assembly.

9. The electric machine module of claim 1 and further comprising a plurality of first rotor hub inlets positioned substantially adjacent to the first axial end and each of the plurality of first rotor hub inlets fluidly coupled with at least one of the plurality of coolant channels, and a plurality of second rotor hub inlets positioned substantially adjacent to the second axial end and each of the plurality of second rotor hub inlets is fluidly coupled with at least one of the plurality of coolant channels.

10. The electric machine module of claim 9, wherein the coolant channels fluidly coupled with the plurality of first rotor hub inlets are fluidly coupled with the machine cavity only at the second axial end and the coolant channels fluidly coupled with the plurality of second rotor hub inlets are fluidly coupled with the machine cavity only at the first axial end.

11. An electric machine module comprising:

a housing at least partially defining a machine cavity; and an electric machine positioned substantially within the machine cavity and at least partially enclosed by the housing, the electric machine including a rotor assembly, including a rotor hub, the rotor assembly operatively coupled to an output shaft, the output shaft including at least one output shaft coolant channel and at least one output shaft coolant outlet in fluid communication with the output shaft coolant channel, the rotor assembly including at least one magnet, a first axial end, and a second axial end, the first axial end substantially opposing the second axial end, the rotor assembly including a plurality of coolant channels extending from the first axial to the second axial end, the plurality of coolant channels in fluid communication with the machine cavity, at least one rotor hub channel positioned through a portion of the rotor assembly, the at least one rotor hub channel fluidly couples the at least one output shaft coolant outlet to at least a portion of the plurality of coolant channels, at least a first rotor hub inlet disposed in a portion of the rotor assembly substantially adjacent to the first axial end, and at least a second rotor hub inlet disposed in a portion of the rotor assembly substantially adjacent to the second axial end, the first rotor hub inlet is fluidly coupled with at least a portion of the plurality of coolant channels and the second rotor hub inlet is fluidly coupled with at least a portion of the plurality of coolant channels, and wherein the portion of the plurality of coolant channels that are fluidly coupled with the first rotor hub inlet, the portion of the plurality of coolant channels that are fluidly coupled with the second rotor hub inlet, and the portion of the plurality of coolant channels that are fluidly coupled with the at least one rotor hub channel are not the same coolant channels.

12. The electric machine module of claim 11 and further comprising at least one balance ring coupled to at least one of the first axial end and the second axial end of the rotor assembly.

13. The electric machine module of claim 12, wherein the at least one balance ring is configured and arranged to guide a coolant into the machine cavity from the plurality of coolant channels.

14. The electric machine module of claim 11, wherein the portion of the plurality of coolant channels that are fluidly coupled with the first rotor hub inlet are substantially sealed immediately adjacent to the first axial end so that the portion of the plurality of coolant channels that are fluidly coupled with the machine cavity only at the second axial end.

15. The electric machine of claim 14, wherein the portion of the plurality of coolant channels that are fluidly coupled with the second rotor hub inlet are substantially sealed immediately adjacent to the second axial end so that the coolant channel are fluidly coupled with the machine cavity only at the first axial end.

16. The electric machine of claim 11 and further comprising a coolant jacket positioned within the housing and a plurality of coolant apertures positioned through a portion of the housing so that the coolant jacket is in fluid communication with the machine cavity.

17. The electric machine module of claim 11, wherein the rotor assembly comprises a first flange positioned substantially adjacent to the first axial end and a second flange positioned substantially adjacent to the second axial end, wherein the first flange and second flange are configured and arranged to guide at least a portion of a coolant through the first and the second rotor hub inlets, respectively.

18. The electric machine module of claim 11 and further comprising a plurality of rotor hub channels fluidly coupling a plurality of output shaft coolant outlets and a portion of the plurality of coolant channels.

19. A method for cooling an electric machine module, the method comprising:
   providing a housing at least partially defining a machine cavity;
   positioning an electric machine substantially within the machine cavity and at least partially enclosed by the housing, the electric machine including a rotor assembly, including a rotor hub, at least one magnet, a first axial end, and a second axial end, and the first axial end substantially opposing the second axial end;
   operatively coupling the rotor assembly to an output shaft, the output shaft including at least one output shaft coolant channel and at least one output shaft coolant outlet in fluid communication with the output shaft coolant channel;
   positioning a plurality of coolant channels within the rotor assembly so that the plurality of coolant channels extend from the first axial to the second axial end, the plurality of coolant channels are fluidly coupled with the machine cavity;
   positioning at least one rotor hub channel through a portion of the rotor assembly, the at least one rotor hub channel is fluidly coupled with the at least one output shaft coolant outlet and at least a portion of the plurality of coolant channels;
   disposing at least a first rotor hub inlet in a portion of the rotor assembly substantially adjacent to the first axial end; and
   disposing at least a second rotor hub inlet in a portion of the rotor assembly substantially adjacent to the second axial end,
      the first rotor hub inlet is fluidly coupled with at least a portion of the plurality of coolant channels and the second rotor hub inlet is fluidly coupled with at least a portion of the plurality of coolant channels, and
      wherein the portion of the plurality of coolant channels that are fluidly coupled with the first rotor hub inlet, the portion of the plurality coolant channels that are fluidly coupled with the second rotor hub inlet, and the portion of the plurality of coolant channels that are fluidly coupled with the at least one rotor hub channel are not the same coolant channels.

20. The method of claim 19 and further comprising substantially sealing at least some of the portion of the coolant channels that are fluidly coupled with the first rotor hub inlets adjacent to the first axial end, and substantially sealing at least some of the portion of the coolant channels that are fluidly coupled with the second rotor hub inlets adjacent to the second axial end.

* * * * *